United States Patent Office 3,172,505
Patented Mar. 9, 1965

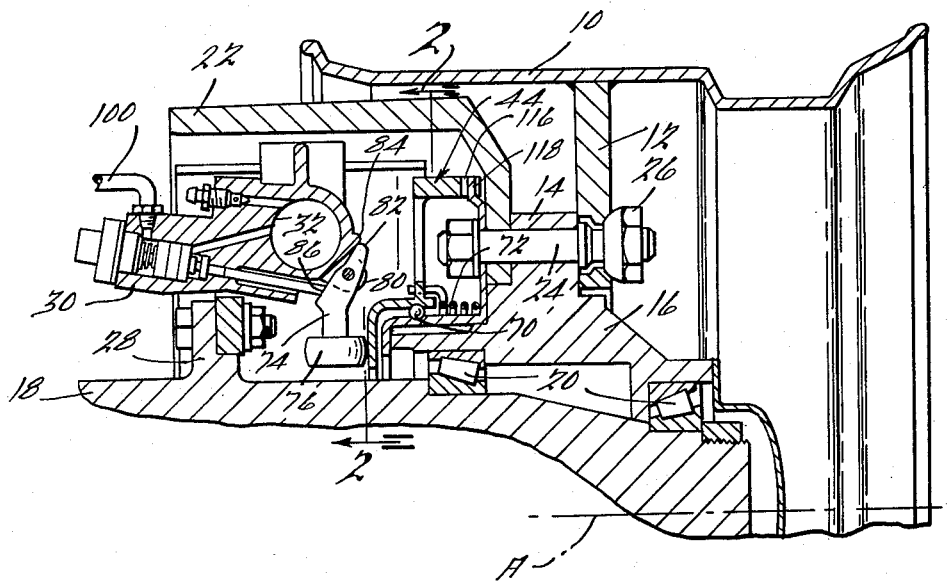

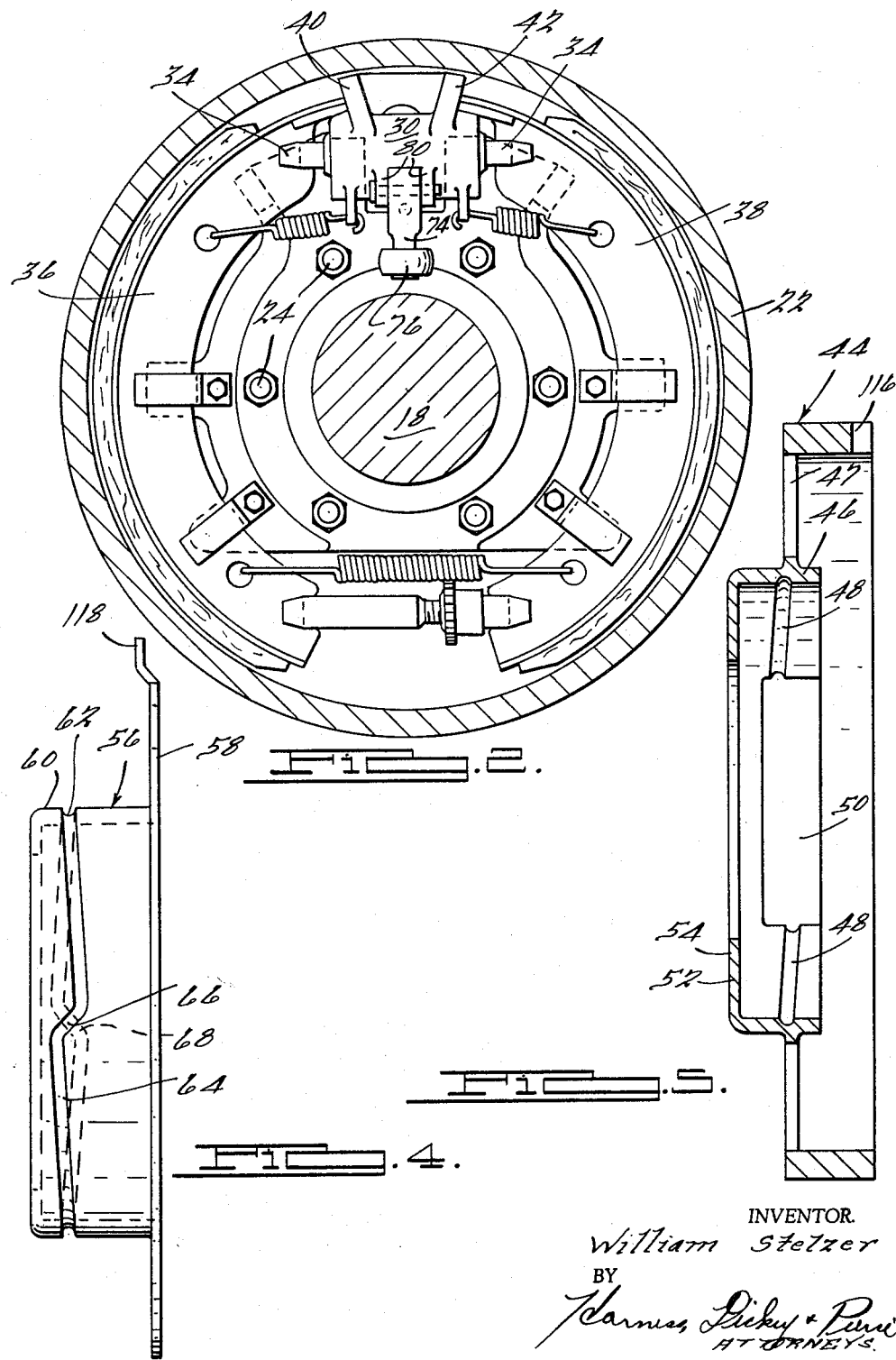

3,172,505
ANTI-SKID BRAKE CONTROL
William Stelzer, Bloomfield Hills, Mich., assignor to Kelsey-Hayes Company, Romulus, Mich., a corporation of Delaware
Filed Oct. 15, 1962, Ser. No. 230,508
8 Claims. (Cl. 188—181)

This invention relates to a vehicle anti-skid brake control device and more particularly to mechanism for reducing the force with which the brakes are applied upon the occurrence of a rate of wheel deceleration sufficient to produce skidding or incipient skidding of the vehicle.

It is an object of the present invention to provide a brake control mechanism for a fluid brake in which the applied brake pressure is opposed to relieve the fluid pressure in a brake cylinder or cylinders upon deleceration of the wheel or wheels being braked at a rate in excess of the rate normally sufficient to effect skidding or incipient skidding of said wheel or wheels.

It is another object of the present invention to provide a brake control mechanism of the above character in which the force with which the applied brake pressure is opposed is derived from the kinetic energy of an inertia member used to detect excessive wheel deceleration and in which the consequent reduction in brake pressure is proportional to the rate of deceleration.

It is a further object of the present invention to provide a brake control device of the above character which eliminates the need for electrical or other force amplifying devices to effect the pressure reduction.

It is another object of the present invention to provide a brake control device of the above character in which brake fluid under pressure from the master cylinder is ineffective to return the inertia member to its normal position following the dissipation of the kinetic energy of the inertia member in opposing the applied brake pressure and in which the inertia member is only returned to its normal position after the rate of deceleration has been moderated to a level at which skidding is not to be expected.

It is a further object of the present invention to provide an anti-skid brake control device which is unaffected by changes in the coefficient of friction between the vehicle tires and the road or between the brake shoes and the brake drum.

It is a still further object of the present invention to provide a brake control device of the above character which is efficient, safe and reliable in operation, which may be fabricated at a relatively low cost, which is durable in construction and which is highly effective for its intended purpose.

These and other objects of the present invention will become apparent from the following detailed description taken in conjunction with the accompanying drawings, wherein:

FIGURE 1 is a fragmentary cross-sectional view of mechanism embodying the present invention shown applied to a vehicle axle and wheel;

FIG. 2 is a sectional view of the structure illustrated in FIG. 1, taken along the line 2—2 thereof;

FIG. 3 is an enlarged view in greater detail of a portion of the structure illustrated in FIG. 1;

FIG. 4 is an enlarged side elevational view of one of the parts of the structure illustrated in FIG. 1; and FIG. 5 is an enlarged vertical sectional view of another one of the parts of the structure illustrated in FIG. 1.

Referring now to the drawings and particularly to FIGS. 1 and 2, the apparatus of the present invention is illustrated in association with a wheel or wheel rim 10 provided with a spider portion 12 connected to the flange 14 of a hub 16. The hub 16 is mounted on a trailer axle 18 by a pair of anti-friction bearing members 20. While the mechanism is illustarted herein as applied to a trailer wheel and the brake therefor, it is to be understood that it is equally applicable to passenger cars, trucks or other wheeled vehicles. The wheel 10 is secured to the hub flange 14 along with a brake drum 22 by a plurality of bolts 24 and nuts 26. The axle 18 is non-rotating, while the hub 16 and the structure mounted thereon rotate on the axle 18 about an axis A. The axle 18 is provided with a raised annular rib or flange 28 to which is secured a housing member 30 having a cylinder bore 32, defining a brake cylinder. The brake cylinder bore 32 receives a pair of pistons (not shown) having piston rods 34 for operating a pair of brake shoes 36 and 38. A pair of raised shoulders 40 and 42, which are formed integrally on the housing 30, form anchors against which the adjacent ends of the brake shoes 36 and 38 abut.

The mechanism of the present invention includes an inertia member or fly wheel 44, which rotates coaxially with the wheel 10. The inertia member 44 extends annularly around the axle 18 and is provided with a hollow cylindrical sleeve portion 46 having a pair of oppositely arranged helical grooves 48 formed on the inner diameter thereof. The helical grooves 48 are identically inclined and extend between and interconnect a pair of oppositely facing recess portions 50, also formed on the inner diameter of the sleeve portion 46. The bottom walls of the recess portions 50 are disposed in a diameter coincident with the bottoms of the grooves 48. The inertia member 44 is also provided with an annular flange or shoulder portion 52 extending radially inwardly from one end of the sleeve portion 46 and having an annular face or shoulder 54 disposed on a plane transverse to the axis of rotation of the wheel 10.

The inertia member 44 is positioned on an annular support or guide member 56 having an annular radially extending flange 58 secured against the brake drum 22 and held for rotation with the wheel 10 by the bolts 24 and nuts 26. The support member 56 includes a hollow sleeve portion 60 surrounding the hub 16 and provided with a pair of oppositely arranged helical grooves 62 and 64 on the outer diameter thereof. The grooves 62 and 64 are interconnected by a pair of opposite connecting grooves 66 and 68 to form a continuous ball receiving track. The grooves 62 and 64 are identically inclined and lie in confronting relation to the grooves 48 of the inertia member 44 to confine a plurality of balls 70 therebetween. The interconnecting grooves 66 and 68 are in confronting relation to the recess portions 50 of the inertia member 44. As the inertia member 44 rotates with respect to the support member 56, the balls 70 roll in the grooves 62, 64 and 48. In passing between the helical grooves 62 and 64, the balls 70 pass through the connecting grooves 66 and 68. The balls 70 will be free to roll through the connecting grooves 66 and 68 so long as the grooves 66 and 68 are in radially confronting relation to the recessed portions 50. Accordingly, free rotational movement of the inertia member 44 is possible through an angle substantially equal to the angular span of the recesses 50. It is believed that if the recessed portions 50 are proportioned to permit a 45 degree angular movement of the inertia member 44 with respect to the support member 56, this will be sufficient for the purposes of operating the device.

It will be seen that upon the application of a braking force which pressurizes the cylinder bore 32 and retards angular movement of the wheel 10, the inertia member 44 attempts to continue to rotate at its previous speed. Attempted rotational movement of the inertia member 44 with respect to the support member 56 is restrained by a helical torsion spring 72 having one end connected to the support member 56 and the other end connected to the inertia member 44. When the rate of deceleration is great enough, momentum of the inertia member 44 will be sufficient to overcome the force of the spring 72, the inertia member 44 will rotate with respect to the support member 56 and, in so doing, it will be moved axially of the wheel 10. Axial movement of the inertia member 44 operates a lever 74 having a free running roller 76 normally in free running engagement with the annular shoulder 54 of the inertia member 44. The lever 74 is pivotally supported between a pair of ears 80 integrally formed on the housing 30. The end of the lever 74 opposite from the roller 76 has a projection 82 which is engageable with an abutment 84 formed on the housing 30 to establish the normal retracted position of the lever 74. It will also be seen that the lever 74 has a pocket 86 that is engageable with one end of a plunger rod 87 which abuts at its other end with a valve stem 88 having an integrally formed valve element 90.

The housing 30 is formed with a second bore 92, through which the valve stem 88 extends and in which a piston 94 is reciprocable. The housing 30 is formed with an inlet opening 96 in communication with one end of the bore 92 and an outlet passage 98 interconnecting the opposite end of the bore 92 and the brake cylinder bore 32. The inlet opening 96 is fitted with a conduit 100 which is adapted to be connected to a source of fluid pressure such as a conventional master cylinder (not shown). The piston 94 has a bypass opening 102 of greater diameter than the valve stem 88 to provide an annular space therearound. A valve seat 104 is formed on the piston 94 at one end of the bypass opening 102 and surrounding the bypass opening 102 for closure by the valve element 90. A light-weight return spring 106 bears against the valve stem 88 and normally maintains it in the position shown in FIG. 3 with the valve element 90 spaced away from the valve seat 104 and the projection 82 of the lever 74 bearing against the abutment 84. Another light-weight return spring 108 surrounding the valve stem 88 bears against the piston 94 to maintain it normally at the end of the bore 92 adjacent the passage 98, as illustrated in FIG. 3.

It will be seen that the housing 30 is provided with a plug element 110 which closes one end of the bore 92 and is fitted with a seal 112 for preventing the leakage of brake fluid past the valve stem 88. The piston 94 also has a double lip seal 114 sealing between the periphery of the piston 94 and the wall of the bore 92 to prevent the flow of fluid from the inlet 96 past the piston 94 to the outlet passage 98.

During normal operation of the brakes, brake fluid will flow from the conduit 100 through the inlet opening 96 and through the piston bypass opening 102 to the outlet passage 98 and into the cylinder bore 32. At this location, the pressurized brake fluid is effective to expand the brake shoes 36 and 38 against the wall of the brake drum 22. At this time, the inertia member 44 is in its normal retracted position, with a shoulder 116 on the inertia member 44 bearing against a projection 118 extending radially outwardly from the flange portion 58 of the support member 56. It is, of course, so held by the spring 72. When the application of brake pressure is sufficient to produce deceleration of the wheel 10 at a rate in excess of a predetermined amount, the inertia of the inertia member 44 will overcome the force of torsion spring 72, to cause relative rotation between the inertia member 44 and the support 56. This rotation is manifested in axial movement of the inertia member 44 to produce pivotal movement of the lever 74. The lever 74 moves the plunger rod 87 in a direction axially of the bore 92, causing the valve element 90 to close against the valve seat 104 and thence to displace the piston 94 in a direction toward the inlet opening 96. This movement of the piston 94 displaces fluid at the inlet opening 96 back toward the master cylinder and provides an enlarged area for fluid at the outlet passage 98, thus relieving fluid pressure in the cylinder bore 32 and reducing the force with which the brake shoes 36 and 38 are pressed against the brake drum 22.

It will be appreciated that the angular movement of the inertia member 44 with respect to the support 56 occurs rather suddenly and the kinetic energy of the inertia member 44 is very rapidly dissipated in moving the piston 94 against inlet fluid pressure. However, when this energy is dissipated, the force of inlet fluid pressure tending to move the piston 94 and the plunger rod 87 back against the lever 74 will not be effective to move the inertia member 44 back to its original position. This is because the lead angle or pitch of the grooves 62, 64 and 48 is "irreversible." That is to say, the angle of the helix is so low that no amount of axial pressure acting against the inertia member 44 will produce rotation of the inertia member 44 with respect to the support member 56. The particular angle at which the helix angle becomes irreversible is dependent upon the coefficient of friction of the two members involved. In the particular embodiment illustrated, it is believed that a lead angle of less than 10 degrees would be effective for this purpose. As a result, the inertia member 44 will remain effective to hold the piston 94 and the valve element 90 in a position relieving the brake pressure within the cylinder bore 32 until such time as the deceleration of the wheel 10 has been moderated to a less severe rate, whereby the spring 72 will be effective to restore the inertia member 44 to its normal position, permitting the lever 74 to return to the position illustrated in FIGS. 1 and 3. When this occurs, the return spring 106 will return the valve stem 88, its valve element 90, and the plunger rod 87 to the position illustrated in FIG. 3. The return spring 108 will also return the piston 94 to the end of the bore adjacent the outlet passage 98, as illustrated in FIG. 3. The bypass opening 102 is thereby reopened, to establish a level of fluid pressure in the cylinder bore 32 which is equal to the operator regulated fluid pressure at the inlet 96. In this position, the mechanism is in readiness for a repetition of the same brake pressure reducing function, should the brakes again be applied in an amount sufficient to produce excessive deceleration.

From the foregoing description, it will be appreciated that the mechanism of the present invention is entirely independent of the particular coefficient of friction between the tires and the road or between the brake shoes 36 and 38 and the drum 22. Conditions of brake fade or slippery pavement will have no effect whatsoever on the operation of the mechanism. Furthermore, it will be seen that the extent of displacement of the piston 94 in a direction toward the inlet opening 96 is controlled by the kinetic energy developed by the inertia member 44. As the rate of deceleration is increased, this kinetic energy will be increased and, thus, the reduction in brake pressure is increased and is substantially proportionate to the rate at which the wheel is decelerated. The particular rate of deceleration at which the inertia member 44 will move relative to its support member 56 is dependent upon its own weight compared to the strength of the spring 72. A spring 72 may be selected which will cause actuation of the inertia member 44 at a desired rate of wheel deceleration. It will be noted that the relationship of the inertia member 44 and its support member 56 provides for very efficient and responsive operation of the inertia member 44, which is substantially unimpaired by frictional forces. The arrangement of the grooves 62, 64, 66 and 68, together with the grooves 48 and the recesses 50, permits the free circulation of the balls 70 in such grooves and recesses to produce axial movement of the inertia member 44 as a result of its angular movement and an amount of axial movement proportionate to the amount of angular movement. It will also be appreciated that the mechanism of the present invention does not bleed off brake fluid from the system upon the detection of an excessive rate of deceleration. The mechanism of the present invention provides a "closed system" and, thus, possible malfunction of the mechanism could not result in a loss of brake fluid which might completely disable the brakes.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A brake control mechanism for use in the fluid brake system of a wheeled vehicle having a source of fluid pressure and a brake cylinder for braking a wheel of the vehicle arranged for pressurization by said source of fluid pressure, said mechanism including fluid displacing means between said source of fluid pressure and said brake cylinder, bypass means formed in said fluid displacing means for the transmission of brake pressure past said fluid displacing means from said source of fluid pressure to said brake cylinder, a valve element for closing said bypass means, and an inertia member operatively associated with said valve element movable upon the occurrence of a predetermined rate of deceleration of the wheel braked by said brake cylinder to cause said valve element to close said bypass means and to impart the kinetic energy of its said movement to said fluid displacing means through said valve element in opposition to the forces applied to said fluid displacing means by said source of fluid pressure.

2. A brake control mechanism for use in the fluid brake system of a wheeled vehicle having a source of fluid pressure and a brake cylinder arranged for pressurization by said source of fluid pressure, said mechanism including a housing having a bore therein, an inlet opening at one end of said bore adapted for connection to said source of fluid pressure and an outlet opening at the other end of said bore adapted for connection to said brake cylinder, a piston in said bore between said inlet opening and said outlet opening, said piston having a bypass opening therein, valve means engageable with said piston for closing said bypass opening and applying a force to said piston for moving said piston toward said inlet opening, and an inertia member movable in a given direction upon the occurrence of a predetermined rate of deceleration of the wheel braked by said brake cylinder and operable thereby to mechanically actuate said valve means by means of the kinetic energy developed by the said movement thereof.

3. A brake control mechanism for use in the fluid brake system of a wheeled vehicle having a source of fluid pressure and a brake cylinder arranged for pressurization by said source of fluid pressure, said mechanism including fluid displacing means between said source of fluid pressure and said brake cylinder, a fly wheel arranged for rotation with a vehicle wheel braked by said brake cylinder, means opposing rotation of said fly wheel with respect to its associated vehicle wheel, antifriction means supporting said fly wheel and operable to produce axial movement of said fly wheel upon the rotation thereof with respect to its associated wheel, and means interconnecting said fly wheel and said fluid displacing means for imparting the kinetic energy of the axial movement of said fly wheel to said fluid displacing means in a direction opposing the force applied to said fluid displacing means by said source of fluid pressure.

4. A brake control mechanism for use in the fluid brake system of a wheeled vehicle having a source of fluid pressure and a brake cylinder arranged for pressurization by said source of fluid pressure, said mechanism including fluid displacing means between said source of fluid pressure and said brake cylinder, a fly wheel arranged for rotation with a vehicle wheel braked by said brake cylinder, means opposing rotation of said fly wheel with respect to its associated vehicle wheel, antifriction means supporting said fly wheel and operable to produce axial movement of said fly wheel upon rotation thereof with respect to its associated wheel, an annular shoulder on said fly wheel disposed in a plane transverse to its axis of rotation, a lever having means engageable with said shoulder for producing pivotal movement of said lever upon axial movement of said shoulder, and rectilinearly movable means operated by said lever to deliver the kinetic energy produced by axial movement of said fly wheel to said fluid displacing means in a direction opposing the force applied to said fluid displacing means by said source of fluid pressure.

5. The structure set forth in claim 4 including a normally open bypass in said fluid displacing means for the flow of fluid from said source of fluid pressure directly to said brake cylinder, and a valve element carried by said rectilinearly moveable means for closing said bypass upon the operation of said rectilinearly movable means by said lever.

6. A brake control mechanism for use in the fluid brake system of a wheeled vehicle having a source of fluid pressure and a brake cylinder arranged for pressurization by said source of fluid pressure, said mechanism including fluid displacing means between said source of fluid pressure and said brake cylinder, a fly wheel arranged for rotation with the vehicle wheel braked by said brake cylinder, a spring opposing rotational movement of said fly wheel with respect to its associated vehicle wheel, a support member for said fly wheel fixed for rotation with the associated vehicle wheel, confronting helical groove means on said fly wheel and said support member, a plurality of balls lying in said groove means for effecting axial movement of said fly wheel upon rotation of said fly wheel with respect to said support member, and means for delivering the kinetic energy developed by the axial movement of said fly wheel to said fluid displacing means in a direction opposing the force applied to said fluid displacing means by said source of fluid pressure.

7. The structure set forth in claim 6 in which said helical groove means possesses a helix angle of less than 10 degrees.

8. A brake control mechanism for use in the fluid brake system of a wheeled vehicle having a source of fluid pressure and a brake cylinder arranged for pressurization by said source of fluid pressure, said mechanism including fluid displacing means between said source of fluid pressure and said brake cylinder, an annular inertia member arranged for rotation with the vehicle wheel braked by said brake cylinder, a torsion spring opposing rotational movement of said inertia member with respect to its associated vehicle wheel, an annular support member for said inertia member fixed for rotation with the associated vehicle wheel, a pair of annularly spaced guide grooves of identical pitch and direction on one of said members, said one member having a pair of connecting grooves interconnecting the opposite ends of said guide grooves, a pair of guide grooves on the other of said members disposed in radially confronting relation to the guide grooves on said one member, said other member having a pair of recesses provided with bottom walls disposed on a diameter coincident with the bottom walls of the guide grooves of said other member, said recesses interconnecting the opposite ends of the guide grooves of said other member and being disposed in radially confronting relation to said interconnecting grooves, a plurality of balls confined between the grooves of said members for guiding said inertia member in an axial direction upon rotation of said inertia member with respect to said support member, and mechanical means operated by said inertia member for delivering the kinetic energy developed by axial movement of said inertia member to said fluid displacing means in a direction opposing the force applied to said fluid displacing means by said source of fluid pressure.

References Cited by the Examiner

UNITED STATES PATENTS

| | | | |
|---|---|---|---|
| 1,988,986 | 1/35 | Sterns | 188—181 |
| 2,012,366 | 8/35 | Wevers | 188—181 |
| 2,827,137 | 3/58 | Lockheed | 188—181 |
| 2,868,338 | 1/59 | Lucien et al. | 188—181 |
| 2,920,924 | 1/60 | Reswick et al. | 188—181 X |
| 2,961,275 | 11/60 | Bent | 188—181 X |

FOREIGN PATENTS 382,241  10/32  Great Britain.

ARTHUR L. LA POINT, *Primary Examiner.*